United States Patent [19]

Sastri

[11] Patent Number: 5,664,723
[45] Date of Patent: Sep. 9, 1997

[54] BRAZING TECHNOLOGY

[76] Inventor: Suri A. Sastri, 10 Bicentennial Dr., Lexington, Mass. 02173

[21] Appl. No.: 549,464

[22] Filed: Oct. 27, 1995

[51] Int. Cl.$^6$ .................................................. B23K 31/00
[52] U.S. Cl. .................. 228/124.1; 228/208; 228/233.2; 428/621; 148/528; 403/272
[58] Field of Search .......................... 228/121, 122.1, 228/124.1, 208, 233.2; 428/621, 632, 627; 403/272; 148/528, 532, 536

[56] References Cited

U.S. PATENT DOCUMENTS

| | | | |
|---|---|---|---|
| 4,506,822 | 3/1985 | Hammersand et al. | 228/233.2 |
| 4,890,783 | 1/1990 | Li | 228/122.1 |
| 5,490,627 | 2/1996 | Krum et al. | 228/124.1 |

*Primary Examiner*—Samuel M. Heinrich
*Attorney, Agent, or Firm*—Mandel E. Slater

[57] ABSTRACT

A method of braze joining a copper member to a substrate of metal or ceramic material is disclosed according to which a diffusion barrier coating as defined is applied to the substrate alone, and a selected brazing alloy is interposed between copper member and substrate, followed by a two-step heating treatment. In the first step the assembly is heated at a temperature and for a time sufficient to melt the brazing alloy and cause a bond to form between the brazing alloy and the copper member and between the brazing alloy and the substrate. In the second step the temperature is raised and maintained in the range from about 600° C. to about 950° C. in a "solutionizing heat treatment" (as defined) for a time sufficient to allow the brazing alloy to form an "extended solid solution" (as defined) with copper in a controlled fashion to convert the bond to a strong joint which is resistant to thermal stress.

17 Claims, No Drawings

BRAZING TECHNOLOGY

FIELD OF THE INVENTION

This invention relates to novel processes involving the utilization of certain thin film coatings on metal or ceramic substrates which are intended to be braze joined to a copper member, resulting in strong joints with high resistance to thermal stress.

BACKGROUND OF THE INVENTION

Soldering and brazing are commonly used joining methods which involve interposing a suitable fusible material between two parts to be joined, heating to cause the fusible material to melt and wet both parts, and then cooling to form a bond between the parts. In common parlance such processes that are carried out at temperatures up to about 450° C. are generally characterized as soldering, above about 550° C. as brazing, and between about 450° C. and 550° C. as hard soldering or soft brazing. Hard soldering and brazing are more commonly employed for end use applications calling for higher strength and temperature resistance than realized in solder joints. For purposes of the present invention, which involves processes involving elements of both soldering and brazing, these processes will hereinafter be referred to collectively as "brazing."

In any event copper and copper alloys can be bonded to various substrates by soldering or brazing depending on the end use of the joint. In order for joining to occur, the molten solder or braze alloy must wet the surfaces of the members to be joined, as indicated above, and the melting temperature of the solder or braze alloy has to be below the melting temperature of the members being joined. In consequence of these requirements various solder alloys have been found useful, of which mention may be made of lead-tin, tin, and tin-silver, for example. Among commonly used braze alloys, mention may be made of copper-silver eutectic alloys, copper-gold, titanium-copper-silver, and nickel-gold systems, for example. (For the purposes hereof the terms "solder alloy," "braze alloy," or "brazing alloy" are intended to include such materials in elemental form, as well as in the form of true alloys.) Such braze alloys enjoy widespread use due to their excellent wetting of common engineering metal surfaces and melting temperatures in an acceptable range of about 780° C. to about 1100° C.

Another important consideration in both solder-bonding and braze-bonding is that the diffusion and alloying between between the molten solder or braze alloy and the members being joined should be kept to a minimum in order to avoid the undesirable formation of voids, microcracks, and brittle intermetallic compounds, resulting in joints that are weak and exhibit poor resistance to thermal shock. Therefore bonding is usually carried out by heating the assembly to just above the melting point of the solder or braze alloy and cooling immediately after adequate flow and wetting has been assured. For example two copper (melting point 1082° C.) members can be joined using tin (melting point 232° C.), which at 250° C. would be molten, wet the copper members, and create a solder joint. If the thus-formed joint is heated further, near 400° C., interdiffusion of tin and copper causes alloying to take place, resulting in the formation of an alloy that melts at over 600° C.; so the parts remain bonded. If the temperature is then raised further, to 700° C. or 800° C. or even higher, increased alloying between the tin and the copper takes place, resulting in a new bond zone alloy with a melting point over 980° C. However a joint fabricated in this manner is generally not acceptable for engineering applications such as heat exchangers for service at temperatures of 700° C. to 900° C., because the copper-tin interaction results in a poor joint with excessive voids and poor resistance to thermal cycling. This condition is not relieved by further heating, even at higher temperatures, but rather is worsened.

This undesired, uncontrolled interdiffusion and alloying among the solder or braze alloy and the members to be joined is a problem affecting many other systems requiring strong joints resistant to temperatures of up to 900° C. or even more. As a further example mention may be made of beryllium, which is desired to be joined to copper in certain fusion reactor applications. Beryllium is a light-weight, high-stiffness metal which is difficult to join to copper and copper alloys with good joint reliability. Initially it is desired to avoid using typical brazes containing a noble metal such as silver or gold, as mentioned previously, because these become highly radioactive when exposed to a high energy neutron flux. Aluminum (melting point 660° C.) and other aluminum-containing brazes might be considered, but when used to join beryllium to copper, the copper is transported across the molten braze alloy at temperatures as low as 550° C. to create a brittle beryllium-copper intermetallic phase in the braze/beryllium interface zone, rendering the joint prone to fracture and failure.

A further deficiency in braze joining copper and copper alloys to ceramic materials such as used in high temperature vacuum feedthroughs is that the aforementioned conventional braze alloys that melt in the 780° C. to 1100° C. range are not well-suited for use with ceramics, since the latter are typically damaged as a result of thermal shock in processing.

SUMMARY OF THE INVENTION

Accordingly it is an object of the present invention to provide a method of brazing a copper member to a metal or ceramic substrate to produce a joint that is strong add resistant to high temperatures.

Another object of the present invention is to provide such a brazing method that avoids the formation of excessive voids, microcracks, and undesirable intermetallic compounds in the braze joint.

A further object of the present invention is to provide such a brazing method for joining a copper member to a ceramic that avoids brittle failure in processing.

Yet another object of the invention is to provide a method for joining a copper member to beryllium without using a braze alloy containing a metal that becomes highly radioactive on exposure to a high energy neutron flux.

With these and other objects in view, a feature of the present invention is the provision of a method of braze joining a copper member to a metal or ceramic substrate. The method includes the steps of applying an adherent non-reactive diffusion barrier coating to the substrate, interposing a brazing alloy between the copper member and the diffusion barrier coating, the brazing alloy in molten form being capable of wetting the diffusion barrier coating, first heating to a temperature and for a time sufficient to liquefy the brazing alloy and form a bond between the brazing alloy and the copper member and brazing alloy and diffusion barrier coating, and then further heating at from about 600° C. to about 950° C. for a time sufficient to allow the brazing alloy to form an extended solid solution with copper from the copper member and thereby convert the bond to a strong joint which is resistant to thermal stress. The invention also contemplates the braze joints so formed.

A detailed description of particular features of the invention, their interactions, and permitted combinations will appear hereinafter, but initially what is meant by certain terminology used herein will now be briefly set forth. In particular the term "copper member" for the purposes hereof is meant to include a member made out of copper metal itself or high strength predominantly copper-based metals and composites of thermal conductivity at least half that of pure copper. (As is well known, combining copper with only small amounts of other materials greatly reduces its thermal conductivity; so the present invention is applicable to copper members that are generally within a few per cent of 100% copper.) A useful example of such a copper based composite is microscopic aluminum oxide dispersion strengthened copper known as "DS copper." In preferred embodiments of the invention, in which the best joints are formed, the face-centered cubic structure of copper is retained, with any alloying elements present at a level which does not exceed that at which such structure would be lost. By "diffusion barrier coating" is meant a coating on the metal or ceramic substrate alone which provides a barrier to the uncontrolled diffusion of atomic species between the copper member and the substrate to which it is to be braze joined, i.e., it substantially eliminates diffusion of elements from either side of the barrier to the other side. As will be proposed hereinafter, the diffusion barrier coating on the substrate controls the progress of diffusion during the heating steps such that, unexpectedly, the formation of excessive voids, microcracks, and/or brittle intermetallic compounds is avoided, allowing instead the formation of a superior bond which is strong and which will withstand thermal stress. Lastly the term "brazing alloy" is meant to include not only those brazes that are true alloys, but also those that may be used in essentially pure, elemental form.

In particular applications of brazing technology according to the present invention the diffusion barrier coating must respond to certain inherent requirements as well as those interdependent with the selection of brazing alloy. As to the former it is necessary that the diffusion barrier coating be compatible with and bond well to the substrate and remain bonded throughout the range of processing and end use temperatures, i.e., not peel off due to severe mismatch in thermal expansion coefficient. The diffusion barrier coating should also be substantially non-reactive with the substrate; this is because the former is applied in a thin layer to the latter and will not be available to perform its function if largely consumed in reaction with the substrate. In addition it is important that the diffusion barrier coating have a melting point higher than that of the materials to be joined so that it does not, itself, impose a lower limit on the service temperature of the resulting joint.

As indicated, the selection of diffusion barrier coating is also dependent on the choice of brazing alloy, since the former must be one that in molten form will be wet by the latter, but will nevertheless provide a barrier to prevent the copper which is diffusing through the braze alloy from also diffusing through it to reach the substrate. In this regard it is a characteristic of the diffusion barrier coating that it does not exhibit solid state solubility with the braze alloy, but instead, under the conditions hereinafter described, forms a stable, temperature-resistant compound with it at the interface which itself provides a barrier to any further diffusion.

With these criteria in view, and addressing embodiments of the invention in which the substrate to which the copper member is joined is itself copper, it has been found that particularly useful materials for the diffusion barrier coating include nickel, niobium, tantalum, titanium, vanadium, their alloys and metalloid compounds, and at least 50 atom per cent, preferably 70 atom per cent, more preferably 80 atom per cent alloys of these with other metals. As further examples mention may be made of nickel-tin alloys, useful up to equal atomic proportions of nickel and tin, which along with the above-cited Ni, Nb, Ta, Ti, and V, work well with tin as the braze alloy, and the metalloid compounds titanium silicide ($TiSi_2$), nickel silicide ($NiSi_2$), niobium silicide ($NbSi_2$), and tantalum silicide ($TaSi_2$), which are useful with a braze foil of aluminum. In these embodiments of the invention, as well as others, it will be apparent that various and numerous combinations of diffusion barrier coatings and braze alloys can be worked out for braze joining specific materials within the stated classes based on common metallurgical knowledge in light of the stated criteria or by routine trial and observation.

In embodiments of the invention where the substrate is beryllium (melting point 1289° C.), applying the stated criteria including care to select based on a very limited alloying tendency at brazing and operating temperatures (up to about 950° C.), particularly useful materials for the diffusion barrier coating include niobium, rhenium, silicon, tantalum, titanium, tungsten, vanadium, their alloys and metalloid compounds (silicides, borides, and germanides), and at least 50 atom per cent, preferably 70 atom per cent, more preferably 80 atom per cent alloys of these with other metals. As specific examples of effective diffusion barrier coatings for beryllium mention may be made of tantalum, vanadium, niobium, tungsten, tungsten/rhenium alloy 74/26 wt %, silicon carbide (as pure SiC), and silicides of nickel, niobium, tantalum, titanium, and vanadium, among others.

The diffusion barrier is fully effective as a thin coating with a thickness in the range of about one micrometer to about ten micrometers. No particular harm is derived from utilizing a thicker coating, up to about 50 micrometers or even more, but no particular advantage is derived, either. The coating may be applied by any conventional means suitable for the particular coating at the desired thickness, such as vacuum vapor deposition, sputtering, ion plating, electroplating, etc.

The braze alloys useful in the practice of the present invention include tin, aluminum, zinc, indium, and gallium, and they can be used in elemental form, in mixed form, or in the form of their permitted alloys. These materials are not among those widely used in conventional brazing applications, and gallium is not particularly preferred due to its high cost and very low melting point, but they are useful here, not only due to their capability of wetting the diffusion barrier coating, but also due particularly to their property of forming an "extended solid solution" alloy with copper. By this is meant that, rather than form a specific intermetallic compound (with specific, fixed atomic ratios) with copper under the conditions hereof, they have the property of diffusing as solute into the copper, with a gradual change or diminishing progression in braze (solute) concentration going across the joint area from the diffusion barrier coating and reaching essentially zero at the copper member. In fact the finished joint is found to contain none of the brazing alloy in its original form, due to the controlled interdiffusion that takes place in the practice of the present invention, but copper is present throughout the joint even when no copper-containing brazing alloy is used. As indicated, the best joints are those in which the copper alloy in the joint is a face-centered cubic solid solution of copper with solute (braze alloy) concentration not in excess of three per cent, this structure being obtained after extended solutionizing treatment at high temperature (but below the melting point of the alloy phase being formed).

In view of the foregoing discussion about limiting the amount of solute in the joint area, it will be appreciated that the amount or thickness of the brazing alloy that is used should be limited in order to form a joint having the desired metallurgical characteristics. A thickness of about five to about 20 micrometers is ideal, and tin foils in this thickness range, for example, are available. As an upper limit it is preferred that the brazing alloy thickness not exceed about 50 micrometers. Depending on the braze material, for example with tin, electroplating can be used to provide thinner layers of brazing alloy, and acceptable results can be obtained with thicknesses as little as about one-half micrometer. Electroplating is convenient also because very thin foils are difficult to work with in terms of handling and fixturing. However, even with electroplating, it is more practical to use at least about two to three micrometers of the brazing alloy, since thinner layers call for strictly conforming surfaces between the copper member and the substrate, which may not be the case.

The formation of braze joints according to the invention requires a two-step heating process, although as will be seen hereinafter, the steps are characterized by the results obtained, and in particular embodiments, the two steps may be carried out as one. In the first step, after the diffusion barrier coating has been applied to the substrate and a "sandwich" with copper member and brazing alloy formed, the assembly is heated to a temperature adequate to liquefy the brazing alloy and maintained there for a time sufficient to allow formation of a good bond between the brazing alloy and the diffusion barrier coating; just melting and wetting out is not sufficient. What is happening in this step is that, as previously indicated, the brazing alloy and the diffusion barrier coating form a stable compound at their interface. In addition a limited but substantial interdiffusion between the copper member and the brazing alloy takes place, which reduces the brazing alloy concentration in the braze zone to about 50 per cent or less and forms a good joint, but one that nevertheless has not yet reached its greatest strength potential. This process is usually accomplished within about one-quarter to about one-half hour; heating in this step for longer times is not harmful, but usually unnecessary.

In the second heating step the temperature is raised and maintained at the higher level to allow further controlled interdiffusion between copper from the copper member and the brazing alloy in order to form the extended solid solution structure characterized hereinabove and further described, with reference to a particular embodiment, hereinafter. Depending on the particular combination of materials this "solutionizing heat treatment" step is generally carried out at a temperature from about 600° C. to about 950° C. and may require as little as about five minutes. Longer heating times than required for the solutionizing heat treatment to be completed are unnecessary, but do no harm, since the bond is now completed and the resulting assembly is now ready for service at temperatures even higher than those used in processing. In fact it is an interesting aspect of the invention that the transformations affecting the brazing alloy convert it to something else with service temperatures generally higher than the melting point of the brazing alloy itself. (Of course the service temperatures must not exceed the melting points of the copper member and substrate to which it is joined.)

More specifically, in embodiments of the invention where tin is employed as the brazing alloy, the first heating step is desirably carried out at a temperature from about 350° C. to about 450° C., more preferably from about 375° C. to about 425° C., for at least about one-quarter hour to one-half hour; and the second heating step is desirably carried out at a temperature from about 700° C. to about 900° C., more preferably from about 700° C. to about 800° C., for at least about one-quarter hour. Depending on the nature of the substrate to be joined to the copper member, preferred temperature ranges for the second heating step may be approximately 650° C. to 750° C., 750° C. to 850° C., or 850° C. to 950° C. In embodiments of the invention where the brazing alloy is aluminum, which does not melt until 660° C., the first and second heating steps would be combined, since a temperature sufficient to melt the aluminum is also sufficient to bring about the solutionizing heat treatment characteristic of the second heating step. In that case heating to about 700° C. to about 800° C. for at least about one-quarter hour completes the joining process.

In a further aspect of the invention, where the desired diffusion barrier coating and the substrate tend to react to form a weak compound at their interface, it may be possible to interpose a protective layer between the two in order to prevent that reaction. For example tantalum is compatible with beryllium and therefore can be used as the diffusion barrier coating for a beryllium substrate. However nickel would be attractive, particularly with tin as the braze alloy, but nickel forms an undesirable intermetallic compound with beryllium. This difficulty can be overcome by using tantalum as a protective coating over the beryllium, to prevent interaction between the beryllium and the nickel, and then applying nickel over the tantalum, followed by brazing with tin in the manner previously described.

Yet another aspect of the invention takes advantage of the fact that copper-to-copper joining gives particularly good results according to the invention. Thus copper can be overplated onto certain substrates and then joined to the copper member as described herein with, for example, a diffusion barrier coating of nickel over the copper and a brazing alloy of tin. Furthermore a thin layer of copper, from about ten micrometers to about 25 micrometers, can be plated onto the diffusion barrier coating itself before application of the braze alloy and strong braze joints will nevertheless result.

The foregoing and other features of the invention may now be more fully appreciated with reference to the following non-limiting examples. In all of the examples any references to a strong joint are meant to indicate that the joint is mechanically strong and resistant to thermal cycling, the latter also being an indication of strength. With regard to mechanical strength specifically, it is noted that when the finished bonded piece is cut apart with a bandsaw for metallurgical examination, the joint does not come apart at the bond zone, as would be the case with a joint that is not mechanically strong. As to thermal cycling the finished piece is subjected to either of (1) heating in boiling water and plunging into liquid nitrogen, in which case a strong specimen remains intact after 20 cycles while a weak one comes apart after only about three cycles, or (2) heating to 900° C. and cooling to room temperature over two minutes, in which case a strong specimen holds together for at least ten cycles while a weak one comes apart in only two or three.

EXAMPLE I

Copper-to-Copper Joining

The copper substrate to be joined is ion plated with nickel to a thickness of one to two micrometers, then joined to an uncoated copper piece with a tin braze foil of one mil (about 6 micrometers) thickness. This assembly is one-half at 400° C. for one-half hour; then the temperature is raised to 750°

C. and held for 20 minutes. The resulting joint is mechanically strong and can subsequently be heated to 950° C. without failure. In like manner the same procedure using any of niobium, tantalum, titanium, or vanadium yields similar results.

While it would not be indicated to try to braze untreated copper to copper with tin, a solder joint would be established upon heating to about 250° C., which upon further heating to 400° C. and beyond would, as a result of uncontrolled interdiffusion of copper and tin, as previously described, result in a weak joint. On the other hand if both copper pieces are provided with a diffusion barrier coating, e.g., nickel, the tin is blocked from reaching and alloying to the necessary controlled degree with the copper, resulting in a solder joint that can't withstand temperatures above the melting point of tin. This comparison highlights the remarkable difference in results obtained as a consequence of providing a suitable diffusion barrier coating on only one of the pieces to be joined.

Metallurgical examination of braze joints according to this example, utilizing electron probe microanalysis or energy dispersive microanalysis (allowing resolution to within one micrometer), reveals a sharp discontinuity in the elemental concentration profile on the side of the joint with the diffusion barrier coating, but a very gradual change on the other side. In the example the nickel acts as a diffusion barrier by forming a thin layer (over a distance of about 10 to 1000 Angstroms) of an intermetallic compound with the tin, and not a solid solution. Within a micrometer into the braze zone and beyond no more nickel is seen, and there is a predominantly copper-based alloy containing tin as the solute, the concentration of which changes over a few tens of micrometers from high copper concentration to all copper, varying continuously in composition and having no undesirable microvoids or other defects, resulting in a sound joint.

EXAMPLE II

Copper to Beryllium

The beryllium substrate is conventionally coated with two micrometers tantalum, followed by two micrometers nickel over the tantalum. Brazing to copper is accomplished with a six micrometer tin foil by heating at 400° C. for one hour and then further heating at 700° C. for one-half hour. The completed joint is strong and can be heated to 900° C. without failure.

This example illustrates the use of a protective coating to separate the desired diffusion barrier coating from the beryllium substrate, with which it would otherwise react to form a weak intermetallic compound. It is possible to use tantalum alone as the diffusion barrier coating, but in this particular application nickel is more preferred, and the tantalum here serves as a protective coating, preventing the undesired interaction between beryllium and nickel.

EXAMPLE III

Copper to Stainless Steel

A coating of 1½ micrometers nickel is applied to a stainless steel substrate, and the copper member is electroplated with ten micrometers tin from a commercial fluoborate bath. The parts are brought together and heated at 400° C. for one hour, followed by further heating at 800° C. for 20 minutes, resulting in a strong joint. Similar results are obtained with the identical process and niobium or titanium as the diffusion barrier coating.

EXAMPLE IV

Alumina and Aluminum Nitride to Copper

In this example the identical process applies to either of these two ceramic materials. The ceramic surface is first sputter coated with niobium to a thickness of two to three micrometers, and then joined to the copper using a braze of six micrometers tin by first heating at 400° C. for one hour and raising the temperature to 900° C. and holding for 20 minutes. With either alumina or aluminum nitride a strong joint is formed that withstands thermal cycling. The thus-formed joints are also vacuum and gas pressure tight.

This example serves to illustrate a particular advantage of the invention in which ceramics can be bonded with a process that avoids the potential damage from thermal shock attendant with the use of conventional high temperature brazes in direct contact with the ceramic. The damage is avoided by initiating the formation of the bond at relatively low temperature (400° C.), using higher temperature only to complete the process. While such damage would also be avoided by metallizing the ceramic with niobium, as in the present example, followed by conventional soldering, the thermal shock problem is avoided, but the joint so formed would not be suitable for use at temperatures above the solder melting point.

EXAMPLE V

Beryllium to Copper

The beryllium substrate is ion plated with two micrometers tantalum, then ion plated with 25 micrometers copper over the tantalum, thereby converting the beryllium surface to a copper surface. In a first variant of this example the thus-prepared substrate is joined to a copper member according to the procedure of Example I, resulting in a strong joint. In a second variant of this example the thus-prepared substrate is joined to a copper member using a 25 micrometer braze foil of aluminum, heating in an oxidation protective inert atmosphere at 750° C. for one-half hour, with a strong joint resulting. In a third variant joining the prepared substrate to copper is carried out with six micrometers tin, heating at 400° C. for one hour, and then further heating at 750° C. for 20 minutes, again resulting in a strong joint.

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A method of braze joining a copper member to a substrate of metal or ceramic, comprising the steps of applying an adherent, non-reactive diffusion barrier coating to said substrate, interposing a brazing alloy between said copper member and said diffusion barrier coating, said brazing alloy in molten form being capable of wetting said diffusion barrier coating, first heating to a temperature and for a time sufficient to liquefy said brazing alloy and form a bond between said brazing alloy and said copper member and between said brazing alloy and said diffusion barrier coating, and further heating at a temperature from about 600° C. to about 950° C. for a time sufficient to allow said brazing alloy to form an extended solid solution with copper from said copper member and thereby convert said bond to a strong joint which is resistant to thermal stress.

2. The method of claim 1, in which said diffusion barrier coating is selected from the class consisting of niobium, rhenium, silicon, tantalum, titanium, tungsten, vanadium, their alloys and borides, germanides, and silicides, and at least 50 atom per cent alloys of these with other metals.

3. The method of claim 1, in which said diffusion barrier coating is selected from the class consisting of nickel, niobium, tantalum, titanium, vanadium, their alloys and metalloid compounds, and at least 50 atom per cent alloys of these with other metals.

4. The method of claim 1, in which said substrate has first been provided with an adherent protective coating capable of preventing the formation of an intermetallic compound between said diffusion barrier coating and said substrate.

5. The method of claim 1, in which said brazing alloy is selected from the class consisting of aluminum, gallium, indium, tin, zinc, their alloys, and mixtures thereof.

6. The method of claim 1, in which the diffusion barrier coating has a thickness of at least about one micrometer, and said brazing alloy has a thickness from about one-half micrometer to about 50 micrometers.

7. The method of claim 1, in which the diffusion barrier coating has a thickness from about one micrometer to about ten micrometers, and said brazing alloy has a thickness from about five micrometers to about 20 micrometers.

8. The method of claim 1, in which said brazing alloy is tin, said first heating step is carried out at a temperature from about 350° C. to about 450° C. for at least about one-half hour, and said further heating step is carried out at a temperature from about 700° C. to about 900° C. for at least about one-quarter hour.

9. The method of claim 1, in which said substrate is copper, said diffusion barrier coating comprises about one to about two micrometers nickel, said brazing alloy comprises about five to about ten micrometers tin, said first heating step is carried out at a temperature from about 375° C. to about 425° C. for at least about one-quarter hour, and said further heating step is carried out at a temperature from about 700° C. to about 800° C. for at least about one-quarter hour.

10. The method of claim 4, in which said substrate is beryllium, said protective coating is tantalum, said diffusion barrier coating comprises about one to about two micrometers nickel, said brazing alloy comprises about five to about ten micrometers tin, said first heating step is carried out at a temperature from about 375° C. to about 425° C. for at least about one-half hour, and said further heating step is carried out at a temperature from about 650° C. to about 750° C. for at least about one-quarter hour.

11. The method of claim 1, in which said substrate is stainless steel, said diffusion barrier coating comprises about one to about two micrometers of a metal selected from the class consisting of nickel, niobium, and titanium, said brazing alloy comprises about five to about 15 micrometers tin, said first heating step is carried out at a temperature from about 375° C. to about 425° C. for at least about one-half hour, and said further heating step is carried out at a temperature from about 750° C. to about 850° C. for at least about one-quarter hour.

12. The method of claim 1, in which said substrate is selected from the class of ceramics consisting of alumina and aluminum nitride, said diffusion barrier coating comprises about one to about five micrometers niobium, said brazing alloy comprises about five to about ten micrometers tin, said first heating step is carried out at a temperature from about 375° C. to about 425° C. for at least about one-half hour, and said further heating step is carried out at a temperature from about 850° C. to about 950° C. for at least about one-quarter hour.

13. The method of claim 1, in which said diffusion barrier coating is overplated with about ten to about 25 micrometers copper.

14. The method of claim 13, in which said substrate is beryllium, and said diffusion barrier coating comprises about one to about three micrometers tantalum.

15. The method of claim 14, in which said brazing alloy comprises about 20 to about 30 micrometers aluminum, and in which said first and further heating steps are combined and carried out at a temperature from about 700° C. to about 800° C. for at least about one-quarter hour.

16. The method of claim 14, in which said brazing alloy comprises about five to about ten micrometers tin, said first heating step is carried out at a temperature from about 375° C. to about 425° C. for at least about one-half hour, and said further heating step is carried out at a temperature from about 700° C. to about 800° C. for at least about one-quarter hour.

17. A braze joint for bonding a copper member to a substrate of metal or ceramic made according to the method of claim 1.

* * * * *